United States Patent [19]
Salter

[11] 3,936,021
[45] Feb. 3, 1976

[54] PIPE SUPPORTS

[75] Inventor: Anthony John Salter, Woodsetton, England

[73] Assignee: Pipe Supports Limited, Warley, England

[22] Filed: Mar. 15, 1974

[21] Appl. No.: 451,348

[30] Foreign Application Priority Data
Mar. 17, 1973 United Kingdom............ 12942/73

[52] U.S. Cl. ............................. 248/54 CS; 248/59
[51] Int. Cl.² ............................................. F16L 3/00
[58] Field of Search ......... 248/54 CS, 18, 204, 324, 248/358 AA, 298, 407, 423, 59; 138/107

[56] References Cited
UNITED STATES PATENTS

| | | | |
|---|---|---|---|
| 548,920 | 10/1895 | Joyce .............................. | 248/407 X |
| 1,685,445 | 9/1928 | Bash .............................. | 248/407 |
| 1,766,400 | 6/1930 | Neely ............................. | 248/407 X |
| 2,652,272 | 9/1953 | Wood ............................. | 248/407 X |
| 2,723,814 | 11/1955 | Roubal ............................ | 248/18 |
| 3,167,285 | 1/1965 | Suozzo ........................... | 248/54 CS |
| 3,194,523 | 7/1965 | Wright et al. .................... | 248/54 CS |
| 3,356,329 | 12/1967 | Santo ............................. | 248/298 X |
| 3,718,305 | 2/1973 | Suozzo ........................... | 248/54 CS |
| 3,833,194 | 9/1974 | Salter ............................. | 248/54 CS |

FOREIGN PATENTS OR APPLICATIONS

| | | | |
|---|---|---|---|
| 1,240,670 | 7/1971 | United Kingdom............ | 248/54 CS |
| 1,231,865 | 5/1971 | United Kingdom............ | 248/54 CS |

*Primary Examiner*—Roy D. Frazier
*Assistant Examiner*—Rodney H. Bonck
*Attorney, Agent, or Firm*—Merriam, Marshall, Shapiro & Klose

[57] ABSTRACT

A pipe support having a frame, a lever pivoted to the frame, elongated resilient means whose ends are engaged by first and second abutments respectively, the first abutment being pivoted to the frame, a draw bar slidably mounted in the first abutment and having its opposite ends connected to the lever and to the second abutment respectively and load attachment means for attaching a load to the lever. The load attachment means is connected to the lever in such a manner that when a load is supported the lever is urged in opposite directions about the lever pivot by the load and resilient means so that the load is supported by the resilient means, and complementary means are provided on the draw bar and the first abutment which can be engaged so that sliding movement of the draw bar relative to the first abutment is prevented and the draw bar is held in a selected one of a number of positions relative to the said first abutment.

2 Claims, 3 Drawing Figures

3,936,021

PIPE SUPPORTS

BACKGROUND OF THE INVENTION

This invention relates to spring supports suitable for supporting loads, e.g. pipes which move due, for example, to thermal expansion and contraction.

More particularly the invention is concerned with a support hereinafter referred to as being of the kind specified, which includes a frame, a lever pivoted to the frame, elongated resilient means whose ends are engaged by first and second abutments respectively, the first abutment being pivoted to the frame, a draw bar slidably mounted in the first abutment and having its opposite ends connected to the lever and to the second abutment respectively and load attachment means for attaching the load to the lever in such a manner that the resilient means and the load respectively urge the lever in opposite directions about its pivot so that the load is supported by the resilient means.

It is sometimes required to lock the lever relative to the frame, i.e. to prevent the lever pivoting relative to the frame. This is required when, for example, supported pipes are being subjected to a hydraulic test or are being cleaned with acid. Under these conditions the load on the support is greater than that for which the resilient means is designed and it is therefore necessary to lock the lever to the frame which takes the load.

SUMMARY OF THE INVENTION

It is an object of the present invention to provide a simple means for locking the lever to the frame.

According to the invention we provide a support of the kind specified including complementary means on the draw bar and the first abutment which can be engaged to prevent the draw bar sliding relative to the first abutment and to hold the draw bar in any one of a number of positions relative to the first abutment.

By preventing movement of the draw bar through the first abutment the lever is automatically locked relative to the frame since the first abutment is itself pivoted to the frame.

Preferably the complementary means have interengageable teeth. Thus there may be a series of teeth spaced apart along the draw bar and a toothed key slidably mounted on the first abutment so as to be movable into and out of engagement with the teeth on the draw bar.

There may be two such toothed keys arranged side by side in the direction of the length of the draw bar whereby the possible number of locked positions of the draw bar is increased as compared with a support where there is only one such key. The or each toothed key may be provided with a formation such as a hook portion whereby it may be levered out of engagement with the draw bar if necessary.

BRIEF DESCRIPTION OF THE DRAWINGS

The invention will now be described in detail by way of example with reference to the accompanying drawings in which.

DESCRIPTION OF THE PREFERRED EMBODIMENT

Figure 1:
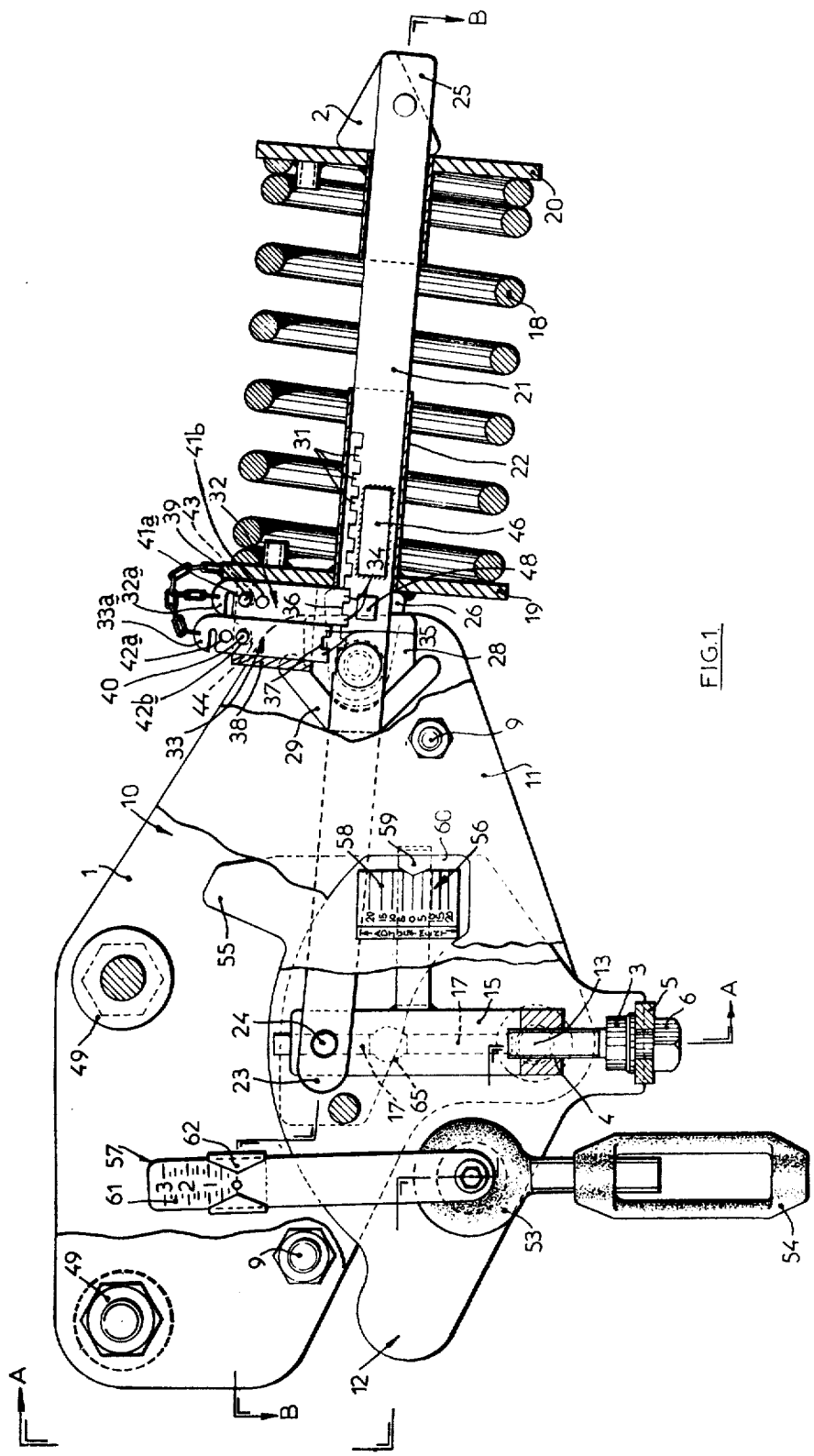
FIG. 1 is a side view partly in section through a support embodying the invention.
Figure 2:
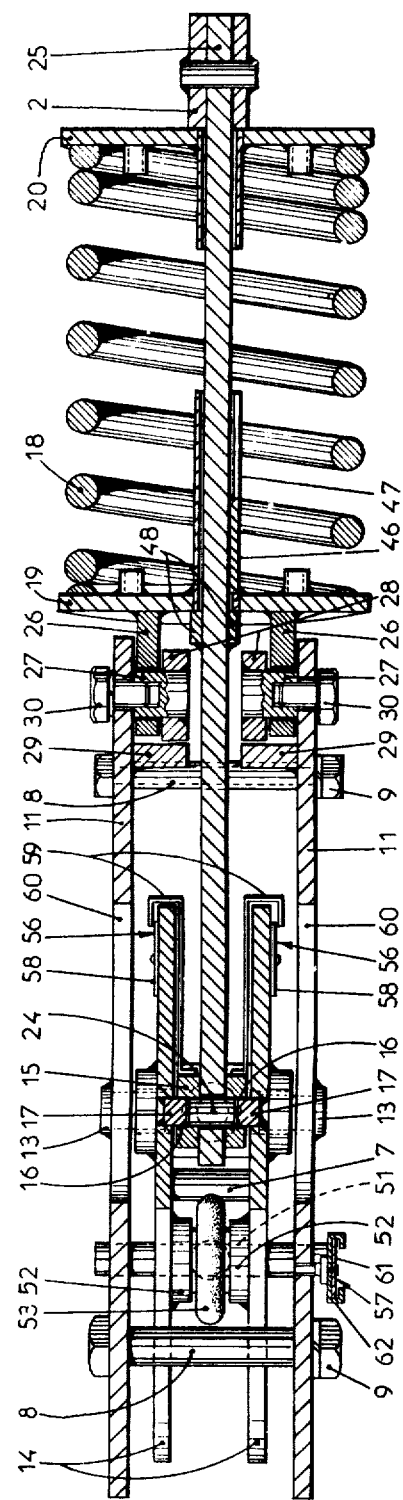
FIG. 2 is a sectional view on the line B—B of FIG. 1.
Figure 3:
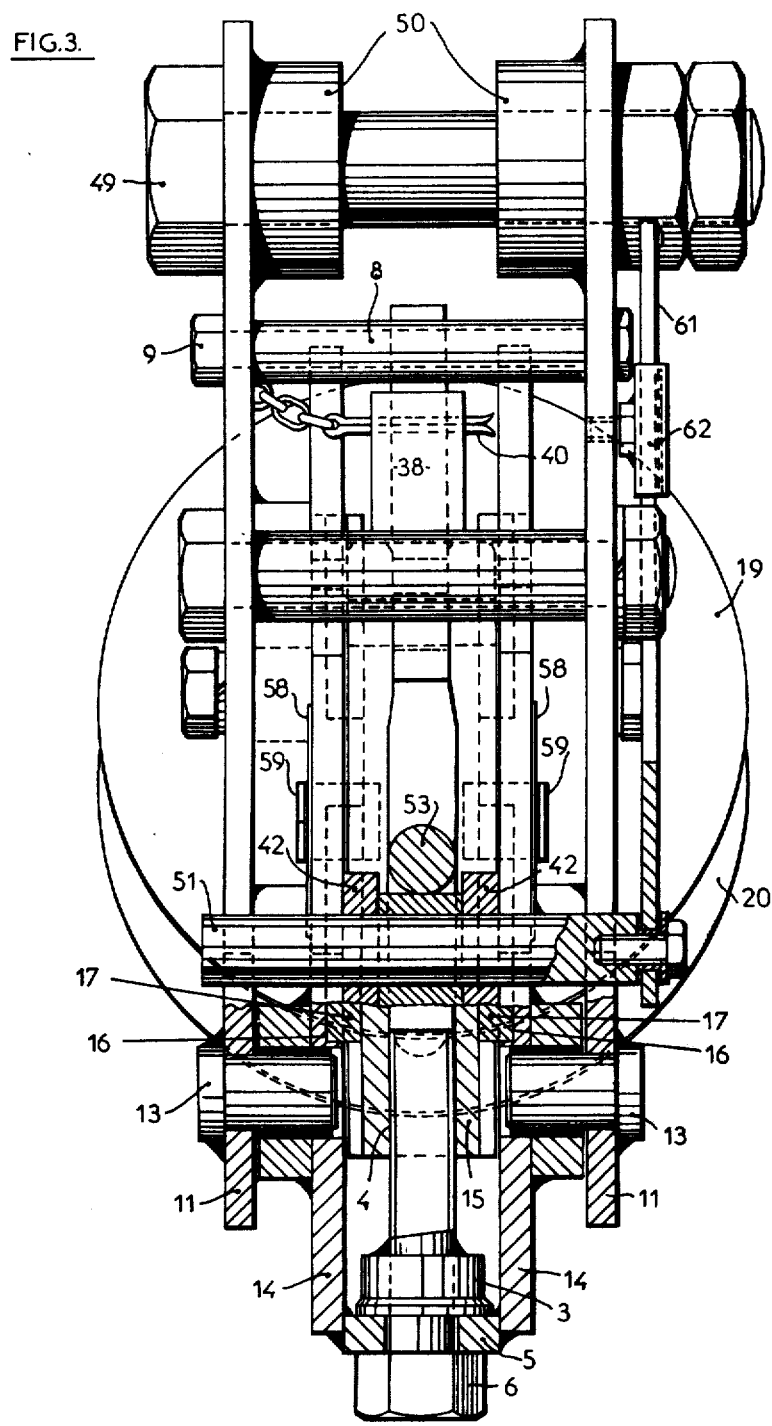
FIG. 3 is a sectional view on the line A—A of FIG. 1.

Referring now to the drawings, the support comprises a frame indicated generally at 10 which includes two spaced side plates 11 which are held together by nut and bolt assemblies 9 and spacing tubes 8. Mounted between the side plates 11 is a lever indicated generally at 12. The lever is pivoted on pins 13 between the side plates 11 and the lever itself consists of two plates 14 which are held apart in spaced relation by a spacer 7.

Mounted between the plates 14 is a shaft 15 of square cross section which is provided with opposed grooves 16 in which are received guide blocks 17 received in slots in the plates 14 and welded therein. Resilient means comprising a helical spring is indicated at 18 and has its ends engaged by first and second abutments 19 and 20. A draw bar 21 is slidably received in a sleeve 22 secured to the first abutment 19 and has one end 23 pivoted by pin 24 to the shaft 15 and thus to the lever 12. The other end 25 of the draw bar 21 is connected to the second abutment by a spring-loaded abutment cam 2 so that the spring 18 acting between the abutments 19 and 20 urges the draw bar to the right as shown in the drawings.

A bolt 6 which is supported on a plinth 5 welded between the plates 14 is arranged to engage an internally screwthreaded bore 4 in the base of the shaft 15. The bolt is held in a fixed axial position on the plinth 5 by a thrust collar 3 which is welded to the bolt shank. Rotation of the bolt 6 thus adjusts the vertical position of the draw bar pivot pin 24 relative to the lever pivot pins 13 and hence varies the moment arm of the spring 18, and thus the load capacity of the support, in a manner known per se.

There are two guide blocks 17 provided on each side of the shaft 15 an aperture 65 being provided in each plate 14 intermediate each pair of blocks so that the pin 24 can be disengaged from the draw bar to allow removal of the spring 18 by aligning the pin 24 with the apertures 65 and punching the pin out of engagement with the draw bar.

The first abutment 19 is provided with two lugs 26 which are pivotally mounted on pivot pins 27 carried by wedge shaped blocks 28 which engage wedge shaped brackets 29 on the internal surfaces of the side plates 11. A set pin 30 passes through each side plate into the adjacent pivot pin 27. It will be noted that there is a lug 26 and block 28 on each side of the draw bar 21.

The draw bar is in the form of a member of generally rectangular cross section and has formed, in the upper edge thereof, a plurality of teeth, some of which are indicated at 31. The teeth are spaced apart lengthwise of the draw bar. Engageable with these teeth are two toothed keys indicated at 32 and 33 respectively. The key 32 has teeth 34 and the key 33 has teeth 35. Between the teeth 34 is a recess 36 capable of receiving one of the teeth 31 and between the teeth 35 is a recess 37 also capable of receiving one of the teeth 31. The sliding movement of the draw bar within the sleeve 22 is guided by a block 46 which engages a slot 47 on the sleeve 22. This ensures that the teeth 31 do not contact the sleeve 22. A pair of stops 48 welded one on each side of the draw bar also limit the movement of the draw bar to the right.

The keys 32 and 33 are slidably mounted for vertical movement in a bracket 38 which is U-shaped in plan and which embraces the keys and is welded to the left hand surface of the abutment 19. The key 32 is associated with a locking pin 39 and the key 33 is associated with a locking pin 40. The keys are provided with apertures 41a, 41b and 42a, 42b respectively to take the pins 39 and 40. The bracket is also provided with two pairs of aligned apertures 43 and 44 respectively. Each key has a hook shaped upper portion 32a and 33a respectively to receive a wedge or other member whereby the key can be levered upwardly should it tend to stick.

The support is arranged to be hung from an overhead support structure (not shown) by nut and bolt assemblies 49 which pass through bosses 50 welded to the inside of the plates 11. The load to be supported is arranged to be secured to the lever 12 by a pin 51 which extends through bosses 52 welded to the inside of the plates 14. In the arrangement shown in the drawings the load would be attached to the lever 12 by an eyebolt 53 and turnbuckle 54. The downward movement of the eyebolt 53 is limited by lobes 55 formed on the plates 14 which, if the lever 12 is rotated sufficiently in an anticlockwise sense, engage the left hand spacing tube 8.

The support is also provided with three indicators; two identical indicators generally designated 56 which show the load capacity of the support in relation to the vertical position of the shaft 15 and a second indicator 57 which shows the proportion of the total travel of the lever 12 which is taken up when supporting a given load.

The indicators 56 each comprise a load capacity scale 58 secured to one of the plates 14 and a pointer 59 secured to the shaft 15, the scale and point being visible through an aperture 60 provided in each plate 11.

The indicator 57 comprises a travel indicating scale 61 which is secured to the end of the pin 51 and a pointer 62 which is secured to one of the plates 11.

Returning to the manner in which the keys 32 lock the draw bar. The key 32 is shown in FIG. 1 with its teeth in engagement with the teeth in the draw bar thus locking the draw bar relative to the first abutment 19. The key is held in this position by virtue of the pin 39 passing through the aperture 41a in the key and through the apertures 43 in the bracket. The key 33 is held with its teeth out of engagement with the teeth on the draw bar by virtue of the pin 40 passing through the aperture 42b in the key and through the apertures 44 in the bracket 38.

It will be appreciated that either of the keys 32, 33 may be engaged with any one of the teeth 31 on the draw bar so as to lock the draw bar in any one of a number of positions relative to the first abutment 19. When the draw bar is so locked the lever 12 is prevented from pivoting and thus a hydraulic load, for example, can be supported from load attachment means 53 and 54.

By having two toothed keys 32 and 33 side by side the number of possible positions in which the draw bar can be locked is increased as compared with the number of positions which would be available if only one such key were provided. It is, however, within the scope of the invention to provide but a single key.

If desired, in order to cope with the high spring loads which may be encountered in large supports the keys may be provided with three or more teeth.

From the above description it will be seen that the invention provides a simple arrangement for locking the lever in a support of the kind specified.

I claim:

1. A support comprising a frame, a lever pivoted to said frame, a first abutment pivoted to said frame, a draw bar slidably mounted in said first abutment and having one end connected to said lever, a second abutment connected to the other end of said draw bar, elongated resilient means acting between said first and second abutments, load attachment means for attaching a load to said lever, said load attachment means being connected to said lever in such a manner that when a load is supported the lever is urged in opposite directions about said lever pivot by said load and resilient means so that the load is supported by said resilient means, a series of teeth spaced along the said draw bar and two toothed keys slidably mounted on said first abutment in side by side relationship in the direction of the length of said draw bar, said keys being alternatively movable into and out of engagement with said teeth along said draw bar whereby said draw bar may be held in a selected one of a number of positions relative to said first abutment, said possible number of positions being increased compared with a support where only one toothed key is employed.

2. A support comprising a frame, a lever pivoted to said frame, a first abutment pivoted to said frame, a draw bar slidable mounted in said first abutment and having one end connected to said frame, a second abutment connected to the other end of said draw bar, elongated resilient means acting between said second abutments, load attachment means for attaching a load to said lever, said load attachment means being connected to said lever in such a manner that when the load is supported the lever is urged in opposite directions about said lever pivot by said load and resilient means so that said load is supported by said resilient means, a series of teeth spaced along said draw bar, a bracket secured to said first abutment, a toothed key slidably mounted within said bracket so as to be movable into and out of engagement with said teeth on the draw bar, and a pin extending through cooperating apertures in said key and bracket to secure said key to said bracket, said key having alternative positions comprising an engaged position in which said teeth on said key are in engagement with said teeth on said draw bar and an unengaged position in which said teeth on said key are not in engagement with said teeth on said draw bar, whereby with the key in said engaged position said draw bar may be held in a selected one of a number of positions relative to said first abutments.

* * * * *